United States Patent [19]

Menchetti

[11] Patent Number: 4,642,418
[45] Date of Patent: Feb. 10, 1987

[54] UTILITY MODULE FOR WALLS AND THE LIKE

[75] Inventor: Robert J. Menchetti, North Olmsted, Ohio

[73] Assignee: Donn Incorporated, Westlake, Ohio

[21] Appl. No.: 759,880

[22] Filed: Jul. 29, 1985

Related U.S. Application Data

[63] Continuation-in-part of Ser. No. 693,873, Jan. 23, 1985, Pat. No. 4,603,229.

[51] Int. Cl.$^4$ .............................................. H02G 3/22
[52] U.S. Cl. ....................................................... 174/48
[58] Field of Search ..................... 174/48, 49, 66, 67; 339/36; 52/221; 312/223

[56] References Cited

U.S. PATENT DOCUMENTS 3,620,404 11/1971 Grasso .............................. 174/48 X
3,636,671 1/1972 Hollister .......................... 52/221 X

FOREIGN PATENT DOCUMENTS 2535914 5/1984 France .................................. 174/48

Primary Examiner—Arthur T. Grimley
Assistant Examiner—D. A. Tone
Attorney, Agent, or Firm—Pearne, Gordon, McCoy & Granger

[57] ABSTRACT

A wall-mounted electrical utility module is disclosed which provides an open, rectangular frame mounted in an opening in one side of a wall. The adjacent, opposite panel closes the rearward side of the frame and cooperates therewith to provide a module chamber. Flange means are provided on the frame which include adjustable plates. The side plates abut with adjacent panels and the upper and lower plates overlap the wall panels above and below the opening. The plates are secured to the wall studs to provide a firm mounting for the module. A removable cover provides access to the module interior. The cover provides sound insulation and a resilient seal. The cover is spaced from the wall so that cords can pass under the edge of the cover and be plugged into receptacles provided within the module.

12 Claims, 5 Drawing Figures

UTILITY MODULE FOR WALLS AND THE LIKE

BACKGROUND OF THE INVENTION

This invention relates generally to wall structures, and more particularly to a novel and improved utility module for walls. This application is a continuation-in-part of my copending application Ser. No. 693,873, filed Jan. 23, 1985 U.S. Pat. No. 4,603,229.

PRIOR ART

Various types of electrical outlets are wall-mounted. Some outlets supply conventional power, such as 110-volt alternating current power, for appliances and the like which are plugged into such outlets. Other outlets are often provided for telephone service and utilize wall-mounted receptacles into which telephones are plugged. Further, it is often desirable to interconnect and network computers and this sometimes requires substantial wiring. Generally in the past, each type of electrical receptacle has been separately mounted in the wall and a separate connection has been provided for each outlet.

SUMMARY OF THE INVENTION

In my copending application Ser. No. 693,873, filed Jan. 23, 1985, a utility module for walls is disclosed in which a framing system is provided within a wall and extends from one wall face to the adjacent surface of the opposite adjacent wall panel and cooperates with such opposite panel to define a module cavity. The various types of receptacles are mounted on such framing members accessible to the module cavity. A removable cover is supported by the framing to close the opening to the module cavity, and is provided with a resilient seal which is locally deformable to allow cords and the like to extend into the module cavity, where they are plugged into the various receptacles provided. Such prior copending application is incorporated herein by reference.

The present invention provides a novel and improved electrical utility module which can be mounted in a typical wall structure. Such module is relatively large and provides a large opening through which cords or cables extend to plug into the various electrical receptacles provided within the module.

In the illustrated embodiment, a rectangular frame having opposed, vertical side walls and opposed, horizontal top and bottom walls, is formed of sheet metal. The side walls extend from the face of the wall, through which access is provided to the module interior, to the inner surface of the adjacent opposed wall panel. In an assembled condition, the rearward surface of the adjacent, opposed wall panel defines the rear of the module cavity and the side walls of the frame define the side walls of the module cavity.

The frame is also provided with flanges extending outwardly from each side wall along a plane substantially in the plane of the face of the wall panels containing the module opening. Adjustably mounted on each of the flanges associated with the vertical side walls of the frame are a pair of vertically extending mounting plates which are structured to abut the adjacent panels and form a neat joint therewith. Top and bottom plates are also adjustably mounted with the associated top and bottom flanges, and are sized for normal installation to fit over the adjacent wall panel edge to seal such edge and also to permit fastening of such top and bottom plates directly to the adjacent wall studs. Such plates, however, may be secured by toggle bolts or the like to the panels above and below the module when wall studs are not available for mounting.

The side plates are also preferably structured to snap over the flanges of typical H-shaped metal studs to further secure the module structure within the wall.

Preferably, the side walls of the frame are utilized for the mounting of the service receptacles for the module. Therefore, such side walls are preferably spaced inwardly from the adjacent studs a sufficient distance to allow clearance for the receptacle itself and for the conductors which connect to the receptacles and extend along the interior of the wall. When the receptacles are mounted in the vertical side walls of the frame, the tendency for dirt or other foreign matter to collect at the receptacle openings is minimized.

A removable cover, preferably formed of sheet metal, is structured to close the module opening and provide edges which are spaced from the wall to allow cords to extend from the exterior of the wall into the module cavity, where they plug into the various receptacles involved. Such cover is also provided with a resilient seal extending therearound which engages the adjacent surfaces of the module to provide a seal therewith. Such resilient seal is locally deformable to allow various cords to extend thereby from the interior of the module cavity to the exterior wall area.

The cover is also preferably laminated to a glass mat or the like, and covered with a decorative material, such as cloth or plastic. Such mat structure cooperates with the seal to provide sound deadening and also provides a stiffness to the cover to give it stability. Further, the cover is preferably sized so that it extends over and hides the module frame and plates from view while allowing easy access to the module cavity when cords must be removed or installed.

With the illustrated module structure, a relatively simple, low-cost service module can be provided within a typical wall system. Such module is sufficiently large to accommodate substantially any type and amount of service required. Typically, such module is located over a work surface and is aesthetically obscured while still providing easy access. Further, the resilient seal provides acoustical as well as physical sealing of the module so that the overall acoustical transmission of the wall is not significantly reduced by the presence of the module.

These and other aspects of the invention are illustrated in the accompanying drawings and are more fully described in the following specification.

DETAILED DESCRIPTION OF THE DRAWINGS

Figures 1, 2:
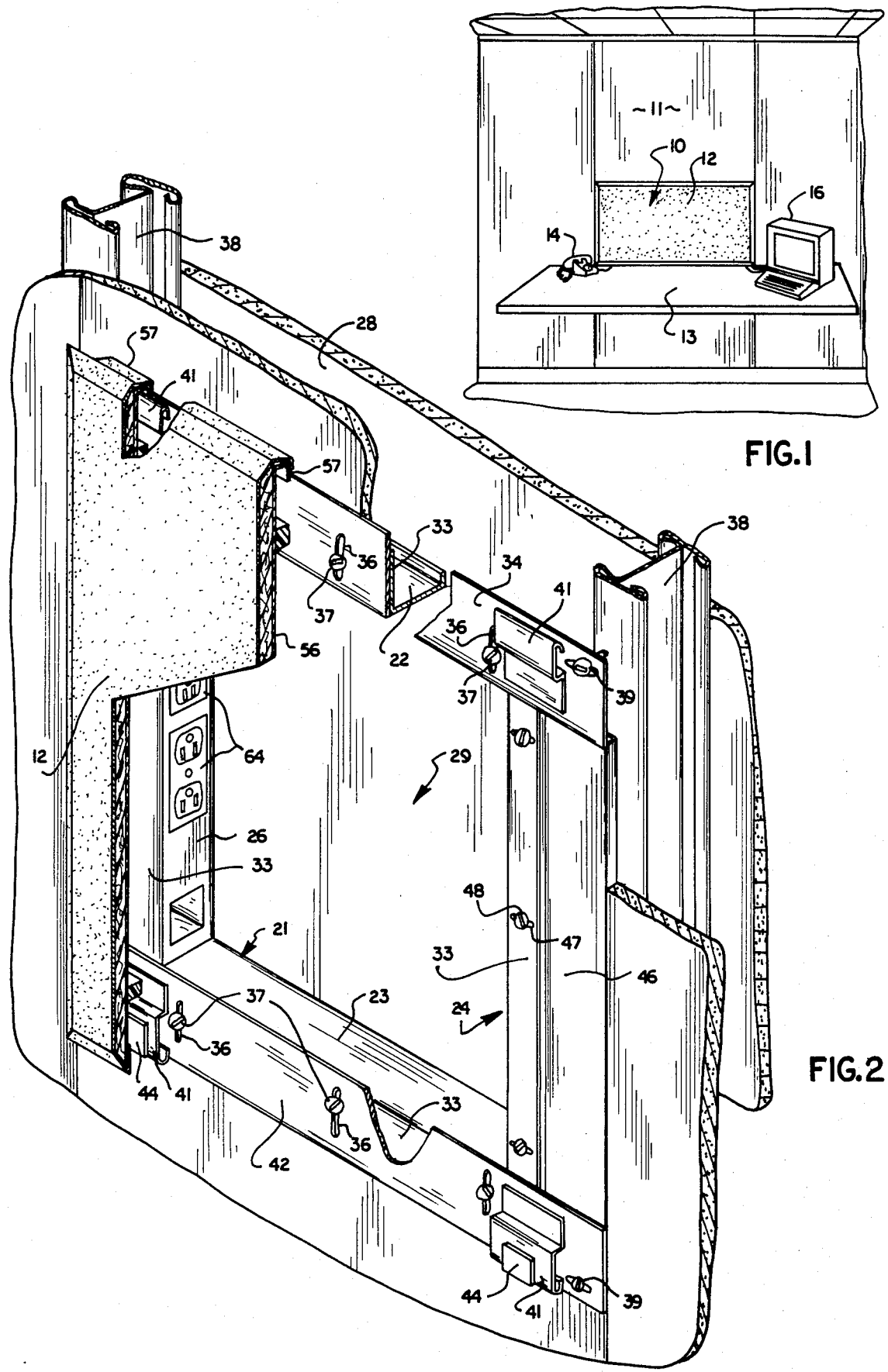
FIG. 1 is a fragmentary view of a section of a room illustrating a typical installation of a module in accordance with the present invention.
FIG. 2 is a fragmentary, perspective view, with parts broken away for purposes of illustration, illustrating the mounting of a module within a typical demountable wall.

FIG. 1 illustrates a typical utility module installation in accordance with the present invention. In such installation, the utility module 10 is located within the wall 11 and is covered by a module cover 12. Typically, the module is located above a work surface 13 which may, as illustrated, be suspended from the wall 11. Further, it is typical to position various appliances on the work surface, such as the phone 14 and a computer or word processor 16. Such appliances are connected by cords which extend under the edge of the cover 12 to receptacles located within the module.

Referring to FIGS. 2 through 5, the module provides an open, rectangular frame 21 providing opposed top and bottom side walls 22 and 23, respectively, and opposed, vertically extending side walls 24 and 26. The side walls are generally similar in structure and have a width substantially equal to the spacing between the plane 27 of the face of the wall and the inner side 28 of the adjacent wall panel 29. The rearward edge of each of the frame walls 22, 23, 24, and 26 is formed with a flange 31 which abuts and extends along the inner side 28 of such adjacent wall panel 29. The open rectangular frame 21 is closed along its rearward side by the adjacent wall panel 29 and forms a module chamber having a thickness or depth substantially equal to the spacing between the panels of the walls plus the thickness of the forward panels 32 in which the module is mounted.

At the forward edge of each of the walls 22, 23, 24, and 26, the frame provides outwardly extending face flanges 33 which extend outwardly from the associated side wall substantially along the plane 27.

Secured to the flange 33 of the top side 22 is an upper support plate 34. The mounting of the upper support plate on the frame is arranged to provide a limited amount of adjustment. This is accomplished by providing vertically extending slots 36 through which sheet metal screws 37 or the like extend. Such screws are threaded into the flange 33 and, when tightened, secure the upper support plate in its adjusted position.

In the illustrated embodiment, the module is mounted in a wall providing spaced, vertically extending metal studs 38 and the upper support plate 34 extends laterally to the centerline of the adjacent studs and is secured to the flange thereof by screws 39. Therefore, the frame is directly supported from the studs in a typical installation.

Hinge brackets 41, described in greater detail below, provide a removable connection for the cover 12. Two such hinge brackets 41 are provided along the upper support plate 34, one being positioned substantially adjacent to each end thereof.

A lower support plate 42 having a structure substantially identical to the upper support plate 34 is adjustably connected to the flange 33 of the bottom side wall 23. Here again, the lower support plate 42 is provided with slots 36 through which screws 37 project to clamp the support plate 42 to the frame. Further, screws 39 again provide a direct connection between the ends of the lower support plate and the adjacent studs 38. Identical brackets 41 are provided on the lower support plate. However, in such instance they do not function as hinge supports for the cover, but merely as spacers to engage the lower edge of the cover and space it from the wall plane 27 so that the cover is maintained parallel to the wall plane. Preferably, magnetic tape 44 is applied to the exterior of the hinge bracket 41 to magnetically clamp the lower edge of the cover 12 against the adjacent hinge bracket.

Figure 3:
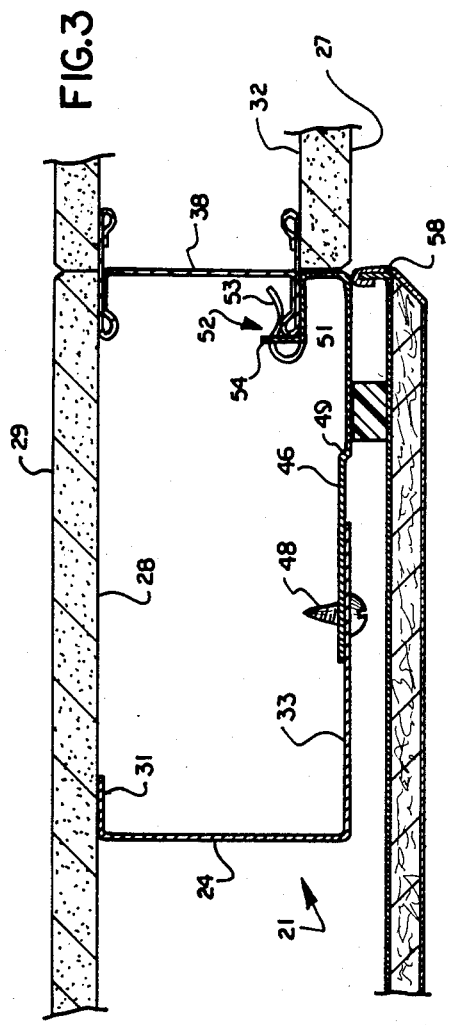
FIG. 3 is an enlarged, fragmentary, plan cross section illustrating the structural detail of the module side plates and their connection with adjacent wall studs.

Similar side plates 46 are mounted on the flanges 33 of the side walls 24 and 26. Such side plates are shaped as best illustrated in FIG. 3. The flanges 33 are formed with slots 47 (see FIG. 2) through which screws 48 extend so that the side plates 46 are adjustably mounted on the associated flange 33.

The side plates 46 are offset at 49 so that the outer portions thereof extend along the plane 27 to a rearwardly extending portion 51, which provides a butt joint with the edge of the adjacent panel 32. Since the side plates 46 are adjustable, they are moved into abutting relationship with the panel and then tightened into position with the screws 48. The side plate also provides a clip-like structure 52 at its edge which snaps over the edge of the adjacent stud 38 to interconnect the side plates directly with the adjacent studs. Such clip structure 52 includes a spring portion 53 which embraces the edge of the stud and a stop portion 54 which accurately locates the side plate with respect to the stud.

Figure 4:
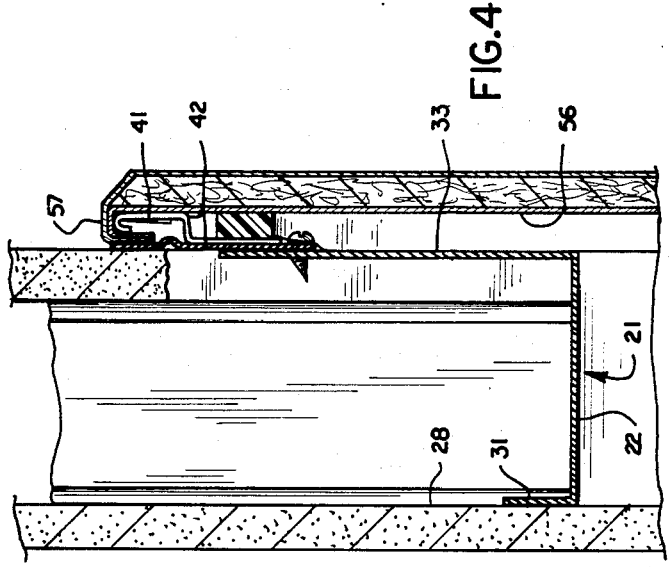
FIG. 4 is a fragmentary, vertical section.

The cover 12 is formed of a metal plate 56 providing a central hook portion 57 proportioned to fit over the upper hinge brackets 41 of the upper support plate 34 and provide a hinge-like support for the cover. This structure is best illustrated in FIG. 4. With this structure, the cover 12 can be pivoted out from the wall about its upper edge with a hinge-like movement, or can be completely removed by merely lifting the upper edge up off the hinge brackets 41.

Figure 5:
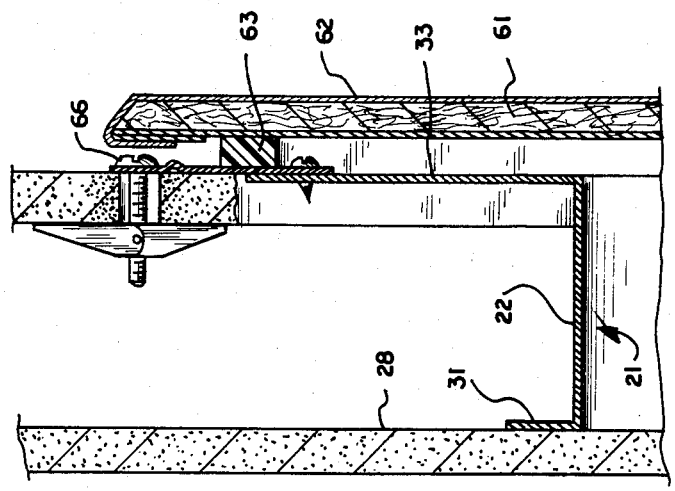
FIG. 5 is a fragmentary, vertical section, illustrating the manner in which the module may be installed at locations spaced from adjacent wall studs.

The plate is also provided with rearwardly extending flanges 58 along its side edges, as illustrated in FIG. 3. Along the bottom edge of the plate, however, the metal is merely bent back to form a flat hem. Consequently, a gap is provided along the bottom of the cover through which cords can extend from the exterior into the module. Further, the ends of the upper edge of the pan 56, beyond the hinge bracket 41, are formed with flat hems providing a zone through which additional cords can be passed from the upper side of the module. This is best illustrated in FIG. 5, which is a section taken beyond the hook portion 57.

The cover 12 is preferably provided with a layer 61 of fiberboard or the like which adds stiffness to the cover and also reduces the transmission of sound through the wall at the module location. Further, a decorative cover 62 is laminated on the exterior. Such decorative cover may be a fabric, sheet plastic, or any other suitable material. It is preferably wrapped around the edge of the panel to eliminate any raw edges.

The cover is further provided with a resilient seal 63 extending therearound which engages the various support plates and side plates to complete the closure of the module. Such seal further cooperates with the cover to minimize sound transmission through the wall in the area of the module. When cords are plugged into the various receptacles in the module and extend out from under the edges of the cover, they cause localized compression of the seal 62.

Various types of service receptacles 64 are mounted along the side walls 24 and 26 so that cords can be connected to the appropriate power source. Such receptacles can, for example, supply standard 110 and 220-volt service, as well as provide for phone connections and computer networking. Because the module is relatively large, ample space is available for a number of different electrical services. The receptacles are preferably located in the side walls so that dust and dirt do not tend to collect in them. Further, the power supply is positioned within the wall and extends up between the side walls and the adjacent studs in a typical installation.

The installation of the module is easily accomplished by merely cutting an opening in the panel at the module location to provide the necessary opening. The module is preferably sized so that it extends across the stud space to the centerlines of the adjacent studs. Therefore, the panels laterally adjacent to the module do not have to be trimmed or cut.

The side plates are then locked onto the stud and abut the laterally adjacent panels 32 to provide a neat joint therewith. The frame is then installed and secured in place. This is easily accomplished because the flange 33 associated with each of the side plates engages the forward face of the side plates, as illustrated in FIG. 3. The upper and lower plates 34 and 42 are then installed and secured at their ends to the studs, to complete the mounting of the entire module structure.

In some intances, it is necessary to install the module at a location where studs are not available, and FIG. 5 illustrates such an installation. In this case, the module is mounted by a toggle bolt 66 directly on the wall panel. It is preferable, however, to provide a direct mounting on the wall stud whenever possible, since such an installation provides greater mounting strength.

With the illustrated embodiment of this invention, the module may be easily installed substantially anywhere along a wall so as to provide electrical services at convenient locations. Since the supply wires are fed through the wall itself, a very neat installation is provided. Further, the module cover 12 provides an attractive enclosure which is easily removed for access to the module interior. Because of the relatively large size of the module, substantially any required amount of wiring and receptacles can be provided in a given installation.

Although the preferred embodiment of this invention has been shown and described, it should be understood that various modifications and rearrangements of the parts may be resorted to without departing from the scope of the invention as disclosed and claimed herein.

What is claimed is:

1. A service module for mounting in walls providing spaced and substantially parallel rows of wall panels, and in which one row provides a panel opening, comprising an open rectangular frame providing two pairs of opposed side walls, said side walls having a width substantially equal to the spacing between said rows of wall panels plus the thickness of said one wall panel row, face flange means extending outwardly from each side wall substantially along a face plane, said flange means being structured to abut against panel edges along sides of said opening and overlap panels above and below said opening, and a cover structured for removably mounting on said frame to close said module and provide access thereto, said flange means associated with one pair of said side walls being adjustably mounted on said frame to adjust for variations in spacing between said adjacent panel edges.

2. A service module as set forth in claim 1, wherein said wall provides spaced studs and said flange means associated with said one pair of side walls provides attachment means adapted to connect with said studs.

3. A service module as set forth in claim 2, wherein said flange means associated with the other pair of said side walls is structured for mounting on studs on both sides of said opening.

4. A service module as set forth in claim 3, wherein said side walls are structured to support electrical receptacles.

5. A service module for mounting in walls providing spaced and substantially parallel rows of wall panels, and in which one row provides a panel opening, comprising an open rectangular frame providing two pairs of opposed side walls, said side walls having a width structured to extend to a position adjacent to the inner side of an adjacent panel in the other of said rows when said frame is mounted in said opening, face flange means extending outwardly from each side wall substantially along a face plane containing the exposed side of said one row, said flange means including a separate plate associated with each side wall adjustably mounted for movement along said face plane substantially perpendicular to the associated side wall, said plates being adapted to mount on said walls to support said frame in said opening.

6. A service module as set forth in claim 5, wherein a cover is provided to close said module, and one of said plates provides hinge means for pivotally supporting said cover.

7. A service module as set forth in claim 6, wherein said hinge means permits easy removal of said cover from said frame.

8. A service module as set forth in claim 7, wherein said hinge means supports said cover so that at least one edge of said cover is spaced from the adjacent plate so that cords can extend therebetween into said frame.

9. A service module as set forth in claim 8, wherein said cover provides acoustical insulation to minimize sound transmission through said wall at said service module and a resilient seal engaging said plates around said opening.

10. A service module as set forth in claim 5, wherein one pair of opposed plates is adapted to form a butt joint with said panels along the lateral sides of said panel and the other pair of opposed plates is adapted to overlap the panel surfaces above and below said opening.

11. A service module as set forth in claim 10, wherein said plates are adapted to mount on studs contained in a wall to support said frame in said opening.

12. In combination, a wall providing spaced studs and rows of panels mounted on opposite sides of said studs, an opening in one panel row between adjacent studs, a service module providing an open rectangular frame having opposed vertical and horizontal pairs of sides, said sides extending from the plane of the face of said one panel row to the adjacent side of an adjacent panel mounted on the opposite side of said studs, said frame and said adjacent side cooperating to define a module cavity open through said opening, service receptacles mounted on opposed vertical sides of said frame open to said module cavity and connected to service by conductors extending along said wall to the sides of said frame opposite said module cavity, said frame providing flange means around said cavity extending along said plane, said flange means being connected to adjacent studs to support said frame in said wall, and a removable cover mounted on said frame, said cover being structured so that cords can extend under the edge thereof into the cavity to be plugged into said receptacles.

* * * * *